United States Patent [19]

Ragsdale et al.

[11] 3,760,100
[45] Sept. 18, 1973

[54] AUDIO ELECTROCARDIOGRAM MONITOR

[75] Inventors: Charles W. Ragsdale, Laramine, Wyo.; Edward A. Wright, Arlington, Va.

[73] Assignee: The United States of America as represented by the Secretary of the Army, Washington, D.C.

[22] Filed: July 30, 1971

[21] Appl. No.: 167,738

Related U.S. Application Data

[63] Continuation-in-part of Ser. No. 866,992, Oct. 16, 1969, abandoned.

[52] U.S. Cl. ......... 179/1 R, 128/2.06 R, 340/384 E
[51] Int. Cl. ........................................... H04m 1/00
[58] Field of Search ................ 128/2.06 R, 2 06 A, 128/2.06 B, 2.06 E, 2.06 F; 332/17; 343/6.5, 7.7; 340/384 E, 248 B, 248 C; 179/1; 330/129; 331/63, 64

[56] References Cited
UNITED STATES PATENTS

| | | | |
|---|---|---|---|
| 3,590,811 | 7/1971 | Harris | 126/2.06 R |
| 3,662,746 | 5/1972 | Saltzberg et al. | 128/20.6 R |
| 3,693,110 | 9/1972 | Briggs, Jr. et al. | 340/384 E X |
| 3,426,150 | 2/1969 | Tygart | 332/17 X |
| 3,199,508 | 8/1965 | Roth | 128/2.06 R |

FOREIGN PATENTS OR APPLICATIONS

| | | | |
|---|---|---|---|
| 1,914,772 | 3/1969 | Germany | 340/384 E |

*Primary Examiner*—Benjamin A. Borchelt
*Assistant Examiner*—A. M. Psitos
*Attorney*—Harry M. Saragovitz et al.

[57] ABSTRACT

The audio monitor disclosed herein is an electronic device which converts the electrocardiogram into an amplitude and frequency modulated tone. This allows the listener to evaluate the shape of an electrocardiogram merely by listening. This is achieved by converting ECG potentials into an amplitude and frequency modulated tone. The tone increases with frequency and becomes louder as the ECG pattern goes positive, and the tone decreases in frequency while becoming louder as the ECG pattern goes negative.

5 Claims, 3 Drawing Figures

FIG. 2

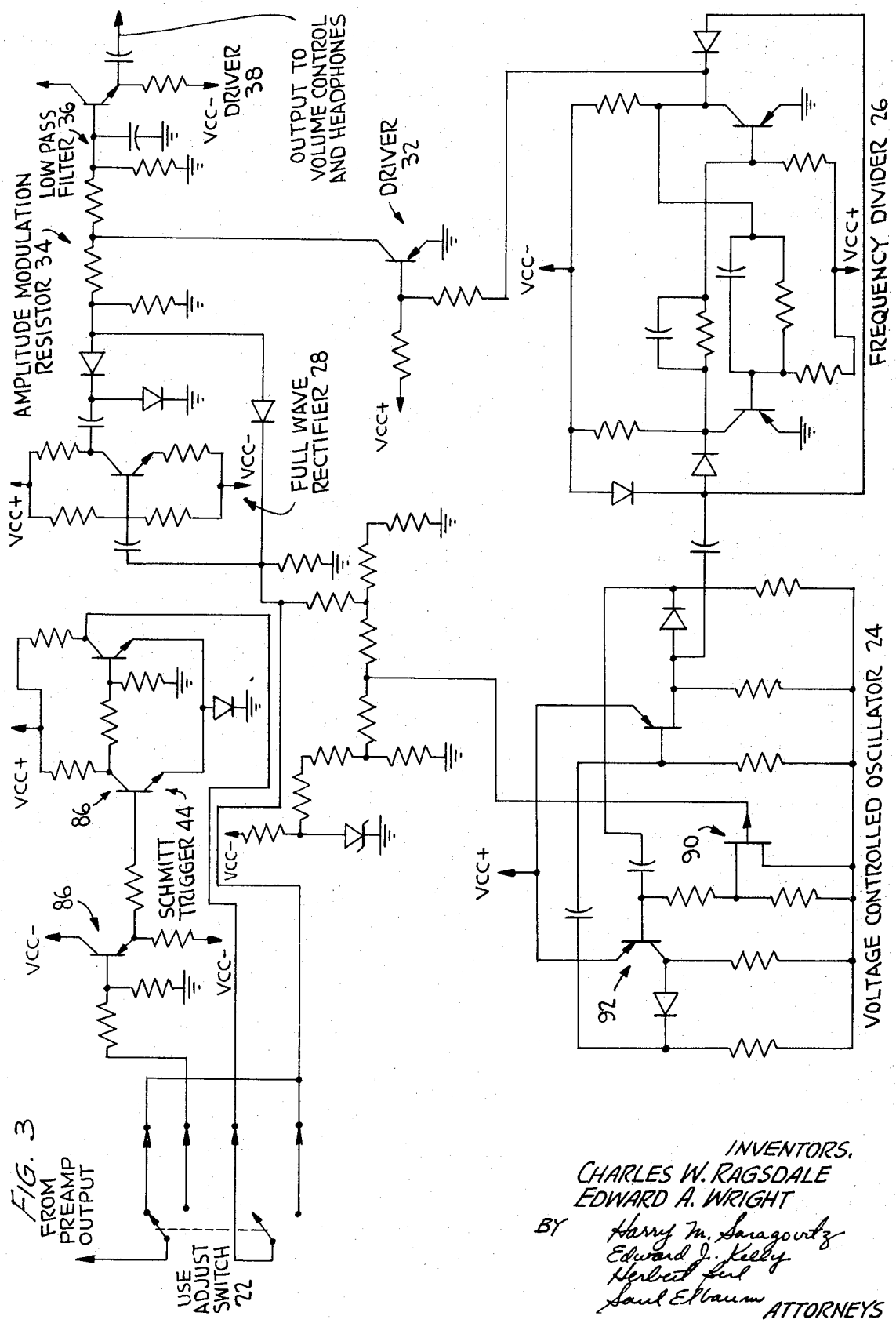

AUDIO ELECTROCARDIOGRAM MONITOR

CROSS REFERENCE

This application is a continuation in part of application Ser. No. 866,992 filed Oct. 16, 1969, in the name of Charles W. Ragsdale et al., which is now abandoned.

BACKGROUND OF THE INVENTION

This invention relates generally to a system for converting electrical signals into audible representations thereof, and more particularly to an electronic device which converts electrical voltage signals into an amplitude and frequency modulated tone so that the electrical signals can be monitored and information about the signals obtained merely by listening.

In many applications, particularly those where time is of the essence, such, for example, as in the monitoring of electrocardiographic or doppler radar signals, a need exists for a device which can accurately convert the subsonic electrical signals into an audible tone representation thereof whereby the same can be monitored merely by listening, thus either supplementing or avoiding the need for visual indicators.

By way of example, a need often exists for rapid determination of various cardiac arrhythmias, such as ventricular fibrillation, asystole and the like. Thus, during open-heart surgery, such as in the repairing of ventricular septal defects, it is necessary that the Purkinje conduction system not be destroyed or blocked when suturing of the hole in the heart wall is performed. With the conventional electrocardiogram device, the surgeon must look up from his work and observe the electrodiogram to see if arrhythmias are being produced so that a determination may be made as to whether the needle has been correctly placed. If the electrocardiogram indicates that arrhythmias are present, then it will be apparent that the needle has been wrongly placed and the same can then be removed and the suturing process tried from a different angle. To eliminate the necessity of a surgeon having to look up from his work, a need existed for a device which could determine if arrhythmias were produced and their waveshapes indicated by just listening. Such would allow the surgeons to complete their work more quickly and therefore improve the chances for a favorable patient recovery.

A need also existed for a device for monitoring cardiac arrhythmias which was of small size and therefore could be made readily available for use in hospital rooms, operating rooms, emergency vehicles and other places where a rapid diagnosis may be needed and where conventional electrocardiogram equipment may not be readily available.

In the past, one manner of diagnosing cardiac arrhythmias was by the use of conventional oscilloscopic or written record electrocardiogram (ECG) devices. While generally quite accurate, such prior art electrocardiogram devices were not always readily available, were quite bulky, and required the surgeon to look up from his work.

One prior art manner of rapidly diagnosing cardiac arrhythmias with audio means was by the use of the conventional stethoscope. While such a device avoided the need of a surgeon or physician from looking up from his work, the stethoscope provided only limited information and could not be used in making such distinctions as determining asystole from ventricular fibrillation.

Recently, others have attempted to develope electronic devices for monitoring cardiac arrhythmias merely by listening. Such devices converted the electrocardiogram signals to frequency modulated audio tone patterns that the physician would learn to recognize. While again somewhat saitsfactory, difficulties were found to exist in separating out the electrocardiogram sounds from the frequency modulated audio tone patterns. Moreover, the frequency modulated devices were highly sensitive to chest position and had no provision for adjusting the preamplifier gain for different electrocardiogram amplitudes. One other drawback of the frequency modulated devices was that they had no provision of determining electrocardiogram amplitude or signal polarity.

By way of further example, in modern day Moving Target Indicating (MTI) Radar usage, the presentation of audio information is usually as important as the presentation of visual information. This allows the radar operator to continue his other duties without having to take time to visually observe a radar scope, such as a plan position indicator (PPI). In fact, in certain small light-weight radars, audio information is now all that is provided.

Understanding that in detecting a moving target (MTI), the doppler difference frequencies between transmitted and received signals are used then it should be apparent that the range or band of doppler frequencies developed depends on the speed of the target and the transmitted RF frequency.

In the past, the majority of radars in use employed quite high RF frequencies which yielded significant doppler frequencies which were all in an audible band of hundreds to thousands of Hz and these could readily be converted and amplified by conventional means for listening.

Recently, however, there has been a reemphasis on developing radar using lower RF frequencies because of the better foliage penetration capabilities. Accordingly, many of the significant doppler frequencies are now in the subaudible range.

Similar to the prior art frequency modulated technique used for monitoring electrocardiogram signals, as described above, the scheme used in radar to convert the low doppler frequencies into an audible range was to use the low doppler frequency signals as an analog control voltage for a voltage controlled oscillator having a center frequency $f_o$ in a popular audible range of 400 or more Hz. Here again, while somewhat satisfactory, it was recognized that the deviation from the center frequency $f_0$ left much to be desired in terms of the radar operator's ability to distinguish target characteristics by merely listening.

SUMMARY OF THE INVENTION

Accordingly, one object of this invention is to provide a unique electronic device for converting electrical voltage signals into audible representations thereof.

Another object of the subject invention is the provision of a new and improved unique device for converting electrical voltage signals to an amplitude and frequency modulated tone such that the electrical voltage signals may be readily determined merely by listening.

A still further object of the subject invention is the provision of a new and improved unique device for converting electrocardiogram signals to an amplitude and frequency modulated tone such that the electrocardiogram signals may be readily determined merely by listening.

Another object of the subject invention is the provision of a new and improved unique device for converting doppler radar signals to an amplitude and frequency modulated tone such that characteristics of a moving target may readily be determined merely by listening.

Yet another object of the invention is the provision of a new and improved voltage to sound conversion monitor which includes provisions for adjusting preamplifier gain for different electrical voltage amplitudes.

Yet still another object of the invention is the provision of a new and improved voltage to sound conversion monitor which includes provisions for determining voltage amplitude and signal polarity.

Yet a further object of the subject invention is the provision of a new and improved electronic device for monitoring electrical voltages wherein the same may be easily analyzed from the amplitude and frequency modulated tones generated.

A still further object of this invention is to provide a unique voltage to sound conversion monitor which is rugged, lightweight and portable.

One other object of this invention is the provision of a unique voltage to sound conversion monitor which is battery operated, inexpensive and easy to construct.

Briefly, in accordance with the preferred embodiment of this invention, these and other objects are attained by the use of a voltage controlled oscillator and amplitude modulation resistor which are responsive to received electrical voltages such that an amplitude and frequency modulated tone signal representative thereof is generated in a manner such that the same may be readily listened to.

BRIEF DESCRIPTION OF THE DRAWING

A more complete appreciation of the invention and many of the attendant advantages thereof will be readily apparent as the same becomes better understood by reference to the following detailed description when considered in connection with the accompanying drawings which illustrate the voltage to sound conversion monitor according to the present invention.

FIG. 2 is a schematic illustration of the front end section of the system, namely, the polarity switch, bandpass differential preamplifier, manual gain adjust, and low frequency switch.

FIG. 3 is a schematic illustration of the circuitry following the preamplifier.

DETAILED DESCRIPTION OF THE PREFERRED EMBODIMENT

Figure 1:
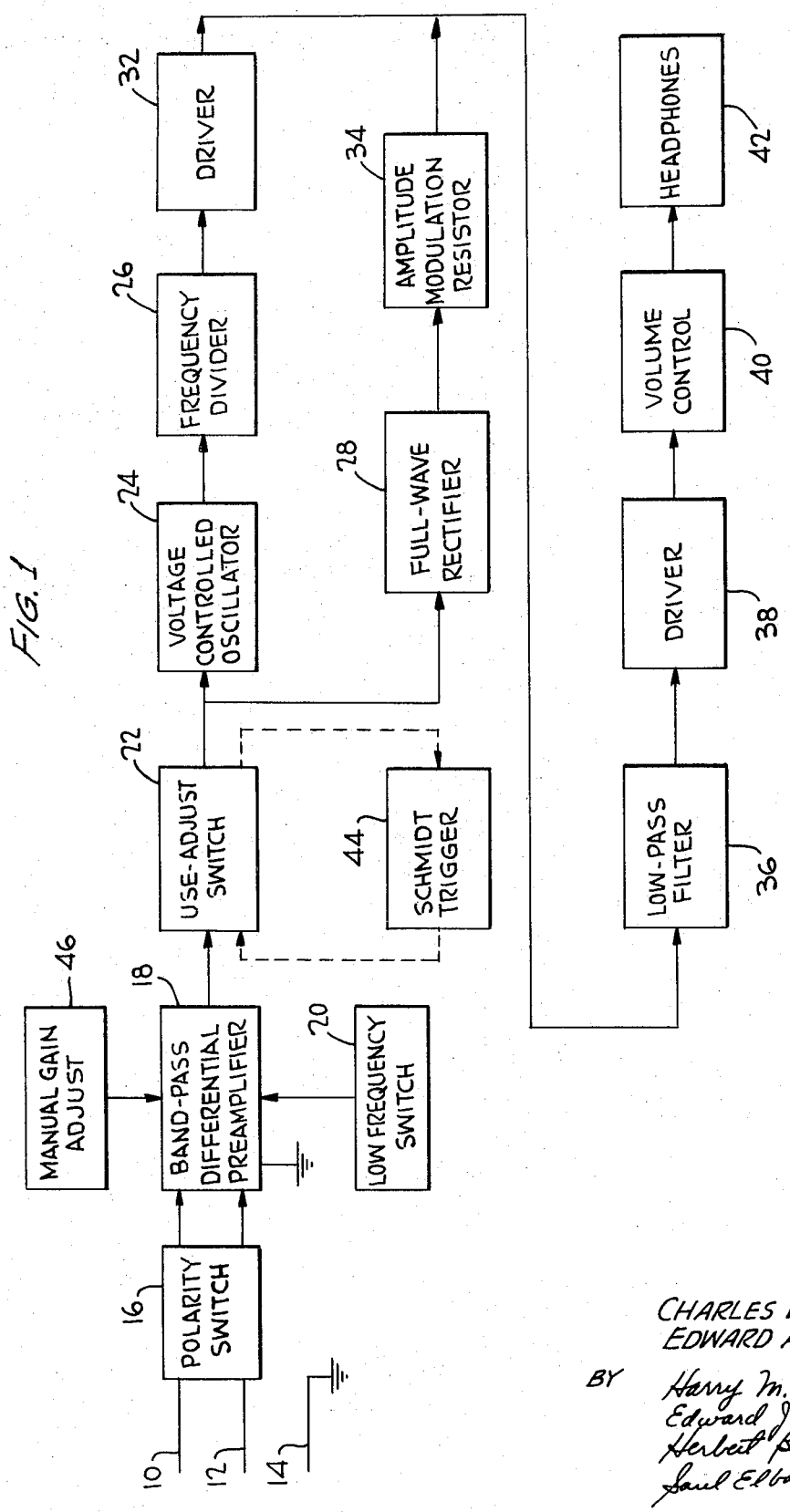
FIG. 1 is a block diagram illustrating the basic building blocks employed in the present audio electrocardiogram monitor.

Referring now to the drawing, and more particularly FIG. 1 thereof, the voltage to sound conversion monitor of the present invention is shown as having three input leads, 10, 12 and 14 attached thereto. ECG potentials are present at the leads. Leads 10 and 12 represent signal leads while lead 14 is grounded. The signals could be those produced by the heart, or in other applications of the system, doppler frequencies from a moving target radar, or any other low sonic potential to be converted into an audio tone which the ear can easily hear.

In the application of the system as an electrocardiogram monitor, the three input leads 10, 12 and 14 will each end in an electrode to be conveniently attached to the patient who is being monitored. The electrode connected to input lead 14 will serve as a ground connection thereby providing system stability. The electrodes connected to the input leads 10 and 12 will serve as sensing electrodes that are commercially available and do not, per se, form a part of the present invention.

The following discussion will concentrate on the block diagram of the system illustrated in FIG. 1. After a discussion of the block system, a more detailed analysis of particular circuitry will be discussed in connection with FIGS. 2 and 3.

ECG potentials from the electrodes are applied along the leads 10, 12 and 14 to a polarity switch 16 where the two signal leads 10 and 12 may be reversed at their connection to the input of the bandpass differential preamplifier 18. The polarity switch 16 is diagramatically shown and its actual operation is explained as follows. In the position illustrated, the upper movable contact is connected to the illustrated (+) terminal while the lower movable contact is connected to the illustrated (−) terminal. The switch may be switched to a second position where the upper movable contact is now connected to the (−) terminal and the lower movable contact is connected to the (+) terminal. The polarity switch 16 is switched to the position which gives a maximum amplitude reading. Depending upon the position of switch 16, amplitude readings will vary due to the additional parallel resistors 60 and 62 which present a different impedance to input terminal 63 than the sole resistor connected to terminal 61. Thus, the polarity switch 16 may be positioned in the position effecting the best impedance matching to the terminals 61 and 63. The electrical voltage signals are then conventionally amplified and filtered by the bandpass differential preamplifier 18. This preamplifier provides input protection to over ± 3000—V. peak at either input of the preamplifier and serves to cancel out signals that are common with both signal leads 10, 12 (such as 60 Hz, 120 Hz, or other interference external to the body). The preamplifier provides high frequency roll-off of initially, nearly 40 dB/decade above 110 Hz and low frequency roll-off of 20 dB/decade (eventually becoming 40 dB/decade) below 1.0 Hz or 0.1 Hz depending upon the position of a low frequency switch 20 which varies the frequency response of the preamplifier 18. This bandpass response results in some attenuation of such noise signals as 120 Hz interference and some muscle potentials at high frequencies, and attenuation of baseline shifts due to electrode potentials at low frequencies. The preamplifier gain can be adjusted by means of a manual gain adjust potentiometer connected in circuit with the preamplifier. The preamplifier has about 0.25 megohms input impedance to reduce the effects of electrode resistance on the balance of the differential amplifier.

When the use-adjust switch 22 is not operative, the preamplifier output is applied directly to the input of a voltage controlled oscillator 24. A parallel connection exists between the preamplifier output and the input of a full wave rectifier 28. This causes an output audio tone to vary in accordance with the preamplifier output.

If very slowly varying potentials, such as intestinal muscle potentials, or in the case of radar applications, some doppler radar signals, are being converted, then the bandpass preamplifier should have a DC response. For reception of electrocardiogram signals, a response of 0.1 Hz has been found to be adequate. A low frequency roll-off modification is provided by actuating the low frequency switch 20. This switch has the effect of adding capacitance in the preamplifier circuit so as to widen the bandwidth of the bandpass preamplifier 18, depending upon whether or not a low frequency response is desired. The bandpass preamplifier 18 will also serve the function of amplifying the input signal as controlled by the manual gain adjust potentiometer 46 (FIG. 2) that is connected in circuit with the preamplifier. Further, the preamplifier performs filtering of the input signals.

Upon application of the preamplifier output to the voltage controlled oscillator 24, the oscillator output will be frequency modulated by increasing in frequency for positive voltages and decreasing in frequency for negative voltages, in accordance with the amplitude of the subsonic electrical voltage signals received. The output of the voltage controlled oscillator 24 drives a conventional frequency divider 26. The purpose of this divider is to insure that the frequency modulated output pulses from the voltage controlled oscillator 24 have a constant duty cycle, for example 50%, and therefore produce no volume modulation due to the frequency modulation. The frequency divider is a flip-flop that changes state with each complete cycle of the voltage controlled oscillator. The divider output frequency is one-half that of the oscillator, and the driver 32 is triggered at the same rate. With a duty cycle of 50% the divider and driver duty cycles will remain at this value, although this is not true of the oscillator output. This constant duty cycle insures that the frequency modulated driver output is not accompanied by additional amplitude modulation.

With the use-adjust switch 22 in the use position, the signal appearing at the output of the preamplifier 18 is simultaneously, with the application thereof to the voltage controlled oscillator 24, applied to and rectified by a conventional full-wave rectifier 28.

The conventional driver circuit 32 will clamp and unclamp an amplitude modulation resistor 34, which takes the form of a conventional resistor connected between the full-wave rectifier and the driver. More specifically, FIG. 3 shows that the driver 32 is a simple transistor switch that clamps the junction point, between resistor 34 and the driver 32, to ground when a drive signal exceeds a threshold value at the base of the driver transistor. The result is a pulse train output to the low pass filter 36 that is frequency and amplitude modulated.

The clamping and unclamping occurs at the frequency rate of the frequency divider 26. A low pass filter 36 is connected in parallel to the output of driver 32 and amplitude modulation resistor 34. This low pass filter causes little loading of the amplitude modulation resistor, so that when the driver 32 unclamps, the voltage at the input of the low pass filter 36 is essentially the full-wave rectified preamplifier output. Hence, the signal at this point is essentially a series of constant duty cycle pulses whose amplitudes are directly proportional to the full-wave rectified preamplifier output and whose frequency goes positive as the preamplifier goes positive, and goes negative with negative shifts in the preamplifier output voltage. The full-wave rectifier 28 serves as a means to produce an increase in the system's audio tone intensity as the preamplifier output increases in either polarity. The low pass filter 36 smooths the square wave, amplitude and frequency modulated tone in order to produce a more pleasing sound. This is done by removing the fast rise time portions of the signal. This smoothed signal is then applied to a conventional driver 38 which is used to drive a conventional volume control 40, which may be, for example, a potentiometer. The output from the volume control 40 is applied to a conventional electroacoustic transducer as a pair of head phones, speaker, or the like. The generated tone is both amplitude and frequency modulated.

The selection of the presently used voltage controlled oscillator control characteristics were made after considering the response of the human auditory system. The ear is most sensitive to changes in pitch in the 500 to 4000 Hz frequency range, and the auditory system senses pitch in a logarithmic fashion. It was first thought that a pitch three octaves above a certain note (and hence higher by a factor of 8) sounds about three times as high in frequency. However, it was later learned that the human subjective sense of pitch, while still logarithmic, has a greater feeling for pitch differences at higher frequencies than at lower ones. Nevertheless, for the purposes of this report, a direct logarithmic relationship is assumed.

The tempered scale (as used in most occidental music) consists of notes related to the next one by a factor of $n = 1.05946$. Hence, the frequency ratio between the first and last of 12 such notes occurring in sequence is determined by $n^{12} = 2$. These two notes are one octave apart.

Between the 500 to 4000 Hz frequency range, there are only three octaves. However, it was felt that a two octave shift on either side of a center frequency was necessary. A center frequency of 1640 Hz gives a minimum frequency of 410 Hz and a maximum frequency of 6560 Hz. This is apparently not too far removed from the human auditory system's most sensitive range. A shift in the high-frequency direction is desirable since the higher tones appear to stand out better.

Since a two-octave shift in oscillator frequency with a 6.0 v. control voltage change was desired, and a linear relationship between the control voltage and perceived pitch change or frequency-change was assumed, the following equation can be written:

$$E_{IN}/6.0 = (\log_2 f/F_o)/2$$

where $E_{IN}$ is the control voltage, $f$ is the frequency at any control voltage, and $F_o$ is the base frequency. This equation can be rewritten as follows:

$$f = F_o (2)^{E_{IN}/3} = F_o (1.26)^{E_{IN}}$$

By way of exemplary use, when monitoring electrocardiogram signals, the electrodes 10, 12 and 14 are attached to the patient and the volume control 40 is adjusted until a tone is heard. The use-adjust switch 22 is first placed in the adjust position and the manual gain control 46 is adjusted until a tone change is heard. In the adjust position, the electrocardiagram signals emitted by the bandpass preamplifier 18 are applied to the input of a conventional Schmitt trigger 44 which will emit a pulse when the preamplifier output (determined by the ECG amplitude and the manual gain adjust control setting) exceeds the Schmitt trigger threshold. The output of the Schmitt trigger is fed back to the input of the use adjust switch 22 whereby an internal connection in this switch causes the application of the Schmitt trigger pulse to be applied to the voltage controlled oscillator 24 which will exhibit a step shift in the frequency. At such time, on a scale (not shown) upon the manual gain adjust control 46 (FIG. 2), will be read the signal amplitude of the electrocardiogram input signal in millivolts or like measure. The polarity switch 16 may then be reversed and the above procedure repeated with the polarity switch being left in the position which gives a maximum amplitude reading.

The use-adjust switch 22 is then placed in the use position so that the Schmitt trigger 44 is removed from the just discussed interceding connection during the adjust position. With the use-adjust switch 22 placed in the use position, the tone monitored by head phones 42 will change pitch and volume in accordance with the wave shape of the electrocardiogram signal received whereby cardiac arrhythmias may be diagnosed merely by listening.

Figure 2:
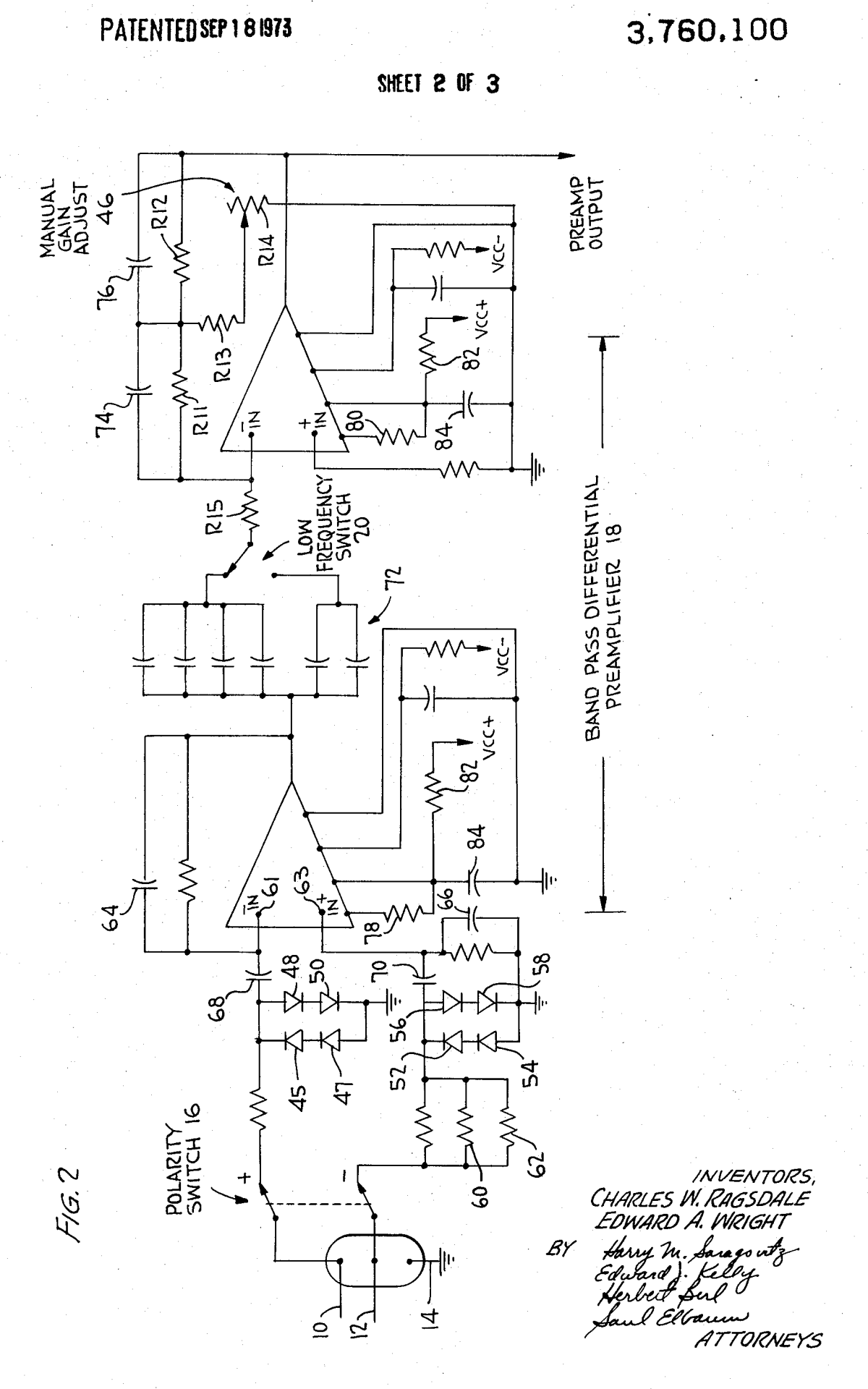

Considering the schematic diagram shown in FIG. 2, the diodes 45, 47, 48, 50, 52, 54, 56 and 58 provide input protection for the differential operational preamplifier 18. Resistors 60 and 62, connected in parallel form a series portion of the circuit between the lower polarity switch terminal and the interconnected diodes 52, 54, 56 and 58. These resistors are selected to give the lowest preamplifier output for a 50 mV p—p sine wave preamplifier input which is within the frequency range of the preamplifier and is applied to both preamplifier input terminals 10 and 12. Capacitors 64 and 66 provide high frequency roll-off of 20 dB/decade (this roll-off begins at a higher frequency than the total preamplifier high frequency response), while capacitors 68 and 70 provide low frequency roll-off, but at a frequency somewhat below 0.1 Hz. The banks of capacitors 72 connected to the low frequency response switch provide the initial 20 dB/decade low frequency roll-off.

In the second section of the differential preamplifier 18, capacitors 74 and 76 provide 40 dB/decade high frequency roll-off and, initially, essentially determine the high frequency response of the preamplifier. In both sections of the differential preamplifier 18, trim resistors 78 and 80 are offset-adjustment resistors, and the power supply inputs of both operational amplifier sections are decoupled by a respective interconnected combination of a resistor 82 and a capacitor 84.

The manual gain adjust potentiometer 46 adjusts the preamplifier gain in a reciprocal fashion.

Referring to FIG. 3, the amplitude and frequency modulation circuitry is shown.

PNP transistor 86 in the Schmitt trigger circuit 44 acts to compensate for $V_{BE}$ potentials of NPN transistor 86. An FET transistor 90 in the voltage controlled oscillator 24 helps provide a nonlinear oscillator response. FET transistor 90 causes the inverted astable multivibrator shown to change frequency by changing the timing resistance at the base of PNP transistor 92. Since this effects only half the cycle, the oscillator duty cycle also shifts with FET 90 control voltage. The frequency divider 26 has a T-input so that its output changes state with each negative input change.

It should be understood that a precedure similar to that described above with reference to the conversion of electrocardiogram signals could be carried out for the conversion and monitoring of doppler radar signals and the like.

It should now be apparent that the apparatus of the herein described invention allows for the audio monitoring of various low sonic potentials merely by listening. Moreover, it should be understood that while the present invention has been described with particular reference to that of monitoring electrocardiogram and doppler radar signals, that it is not so limited, and may be used for the audio monitoring of other low sonic potentials, such, for example, as those produced by the brain, other biological potentials, other electrical signals and the like. Additionally, it should be understood that the voltage to sound conversion monitor of the present invention may be battery operated and portable. The monitor as described, as a choice of design may be rugged, lightweight, inexpensive and easy to construct.

It should be understood that the invention is not limited to the exact details of construction shown and described herein for obvious modifications will occur to persons skilled in the art.

What is claimed as new and desired to be secured by Letters Patent of the United States is:

1. A voltage to sound conversion monitor comprising:

a band pass preamplifier having electrical voltage signals connected at the input thereof;

a voltage controlled oscillator connected to the output of the preamplifier, the output of the voltage controlled oscillator being frequency modulated in accordance with the amplitude of said electrical voltage signals;

a frequency divider connected at its input to the output of the oscillator for assuring that the frequency modulated output of said voltage controlled oscillator has a constant duty cycle;

driver means connected between the output of the frequency divider and a junction point for clamping the junction point to preselected potential when the input to the driver exceeds a preselected voltage threshold;

a full-wave rectifier having its input connected to the output of the preamplifier for rectifying the signals appearing thereat;

an amplitude modulation resistor connected between the rectifier and the junction point for amplitude modulating the frequency modulated output of the voltage controlled oscillator in response to periodic clamping of the junction point by the driver means;

an electroacoustical transducer connected to the junction point for responding to the amplitude and frequency modulated signal thereat for converting the signal into an acoustical tone;

a use-adjust switch connected between the preamplifier and the voltage controlled oscillator, the switch being initially set in the adjust position;

a Schmitt trigger connected across the switch; and manual gain adjust means connected to the preamplifier for indicating the amplitude of said electrical voltage signals directly, after proper manual gain adjustment.

2. A voltage to sound conversion monitor as in claim 1, further including a polarity switch connecting the voltage signals to the preamplifier for allowing the polarity of said electrical voltage signals to be adjusted for maximum preamplifier output.

3. A voltage to sound conversion monitor as in claim 2, wherein said electroacoustical transducer is a speaker.

4. A voltage to sound conversion monitor as in claim 2, wherein said electroacoustical transducer is a pair of headphones.

5. A voltage to sound conversion monitor as in claim 4, including a low-pass filter connected to the input of the transducer for filtering said amplitude and frequency modulated tone in order to remove the fast rise time portions thereof in order to provide a clear tone.

* * * * *